US012473934B2

(12) United States Patent
Chacko

(10) Patent No.: US 12,473,934 B2
(45) Date of Patent: Nov. 18, 2025

(54) HYDRAULIC SURGE DAMPENER

(71) Applicant: KMT Waterjet Systems, Inc., Baxter Springs, KS (US)

(72) Inventor: Shajan Varghese Chacko, Joplin, MO (US)

(73) Assignee: KMT Waterjet Systems, Inc., Baxter Springs, KS (US)

( * ) Notice: Subject to any disclaimer, the term of this patent is extended or adjusted under 35 U.S.C. 154(b) by 0 days.

(21) Appl. No.: 17/877,728

(22) Filed: Jul. 29, 2022

(65) Prior Publication Data

US 2024/0035495 A1 Feb. 1, 2024

(51) Int. Cl.

*F15B 15/14* (2006.01)
*F04B 9/113* (2006.01)
*F04B 11/00* (2006.01)
*F04B 1/02* (2006.01)
*F15B 15/22* (2006.01)

(52) U.S. Cl.

CPC .......... *F15B 15/1447* (2013.01); *F04B 9/113* (2013.01); *F04B 11/0091* (2013.01); *F15B 15/1433* (2013.01); *F04B 1/02* (2013.01); *F15B 15/222* (2013.01); *F15B 15/223* (2013.01)

(58) Field of Classification Search

CPC .............. F15B 15/1447; F15B 15/1433; F15B 15/222; F15B 15/223

See application file for complete search history.

(56) References Cited

U.S. PATENT DOCUMENTS

| | | | | |
|---|---|---|---|---|
| 2,443,312 A * | 6/1948 | Geiger | B23Q 5/26 | 91/394 |
| 2,876,799 A * | 3/1959 | Mercier | F15B 1/24 | 138/31 |
| 3,677,141 A * | 7/1972 | Lagerqvist | F24D 11/00 | 91/394 |
| 3,974,910 A * | 8/1976 | Papai | F15B 15/222 | 91/394 |
| 4,718,330 A * | 1/1988 | Mitton | F16F 9/19 | 92/143 |
| 4,747,758 A * | 5/1988 | Saurwein | F04B 9/105 | 91/275 |
| 4,807,520 A * | 2/1989 | Navarette | F15B 15/1447 | 92/172 |
| 5,517,898 A * | 5/1996 | Kim | F15B 15/222 | 92/143 |
| 9,309,873 B2 * | 4/2016 | Roll | F04B 19/22 | |
| 2012/0063939 A1 * | 3/2012 | Mann | F04B 3/00 | 417/482 |
| 2015/0007718 A1 * | 1/2015 | DeOcampo | F15B 15/1447 | 92/174 |

* cited by examiner

*Primary Examiner* — Dustin T Nguyen
(74) *Attorney, Agent, or Firm* — Cozen O'Connor

(57) ABSTRACT

One or more components of a high pressure pump include a hydraulic surge dampener. The hydraulic surge dampener mitigates or prevents damage that results from a sudden pressure surge that results from impact of components, for example a hydraulic piston and a hydraulic head, of the high pressure pump. The hydraulic surge dampener may include one or more grooves, one or more through holes, or a combination thereof. The hydraulic surge dampener may be carried by or be part of one or more components of the high pressure pump, such as the hydraulic piston, the hydraulic head, or both.

25 Claims, 14 Drawing Sheets

HYDRAULIC SURGE DAMPENER

TECHNICAL FIELD

The present disclosure generally relates to high pressure fluid systems, such as high pressure pumps and intensifiers. In particular, the present disclosure relates to hydraulic pistons and heads that dampen or prevent hydraulic surge that may otherwise occur during operation of a high pressure pump.

BACKGROUND

Description of the Related Art

Precision cutting for industrial and commercial purposes is often accomplished through the use of a waterjet system that directs a high speed stream of water at a material surface to be cut. Waterjet systems pressurize water to 15,000 psi or greater and convert that pressure to a fluid stream traveling at speeds in excess of Mach 2. This high velocity stream, often mixed with an abrasive, is capable of slicing through hard materials such as metal and granite with thicknesses of more than a foot.

The pumps operating within a waterjet system include plungers that reciprocate within a high pressure chamber to pressurize a fluid in the chamber, and can further include check valves to allow fluids into and out of the high pressure chamber. The pumps typically include seals between the plunger and an inner wall of the chamber and between the check valve and the inner wall of the chamber to prevent high pressure fluid from leaking out of the chamber.

The high pressure fluid flows through a check valve body to an outlet check valve. If the pressure of the fluid is greater than a biasing force provided by high-pressure fluid in an outlet area acting on a downstream end of the outlet check valve, the high pressure fluid overcomes the biasing force, and passes through the outlet check valve to the outlet area. Typically, a pump has multiple cylinders, and pressurized fluid from the outlet area of each pump is collected in an accumulator. High-pressure fluid collected in this manner is then selectively used to perform a desired function, such as generating a fluid jet to process (e.g., cut) a workpiece.

Referring to FIG. 1, a known high pressure pump 10 includes a pressure vessel 20 with opposite faces 23 and a bore 22 extending through the pressure vessel 20 between the opposite faces 23. Two inserts 30 (shown as a plunger 30*a* and a check valve assembly 30*b*) extend into the bore 22 from opposite ends. The plunger reciprocates within the pressure vessel 20 to pressurize a fluid in the pressure vessel 20. The plunger 30*a* may be driven by a hydraulically actuated piston 11 or alternatively by a mechanical actuator.

The check valve assembly 30*b* has check valves 33 for admitting unpressurized fluid into the pressure vessel 20 during an intake stroke of the plunger and allowing pressurized fluid to exit the pressure vessel 20 after a power stroke of the plunger 30*a*. Both inserts 30 are held in position relative to the pressure vessel 20 by a yoke 12 that includes end caps 13 secured with threaded rods 15 that bias the end caps 13 toward the pressure vessel 20.

Two seal assemblies 40 (shown as a dynamic seal assembly 40*a* and a static seal assembly 40*b*) may seal a gap 21 between the inserts 30 and an inner wall of the bore 22 to prevent fluid from leaking from the pressure vessel 20. The dynamic seal 40*a* seals a portion of the gap 21 between the reciprocating plunger 30*a* and the inner wall 25, and the static seal 40*b* seals a portion of the gap 21 between the stationary check valve body 30*b* and the inner wall 25. A sleeve 14 adjacent the inner wall 25 between the seal assemblies 40 reduces the volume of the gap 21.

BRIEF SUMMARY

In some known high pressure pumps, hydraulic oil forces a hydraulic piston to move in a first direction, referred to as a "stroke." At the end of the stroke, the hydraulic piston stops its movement in the first direction, and then reverses to begin movement in a second direction that is opposite the first direction. The inertia of the hydraulic piston may result in impact of the hydraulic piston and another component of the high pressure pump (e.g., a hydraulic head) that is adjacent the hydraulic piston at the end of its stroke.

Such an impact may result in hydraulic oil (e.g., trapped within a front pocket of the hydraulic piston) being subjected to a sudden pressure surge. This pressure surge may result in damage or failure of components of the high pressure pump (e.g., locating pins, retaining springs, plunger, etc.). The risk of this damage or failure may increase significantly if a check valve mounted within the hydraulic piston is damaged such that hydraulic fluid is permitted to leak into the front pocket of the hydraulic piston within which the plunger may be secured. The pressure surge within the front pocket may result in ejection of the plunger from the pocket.

The present disclosure is directed to pressure relief structures and components that provide passage for trapped hydraulic oil (e.g., within a front pocket of a hydraulic piston) so as to prevent a sudden pressure surge.

According to one embodiment, a hydraulic piston includes a body, a pocket, and a hydraulic surge dampener. The body extends along an axis from a front surface of the body to a rear surface of the body, and the body includes a shoulder portion and a neck portion. The shoulder portion has a first cross-sectional dimension measured in a first direction that is perpendicular to the axis. The neck portion extends out from the shoulder portion along a second direction that is parallel to the axis, and the neck portion has a second cross-sectional dimension measured in the first direction, wherein the second cross-sectional dimension is less than the first cross-sectional dimension.

The pocket extends into the neck portion along a third direction that is opposite the second direction. The pocket enters the neck portion through an opening in the front surface, which is spaced from the shoulder portion by the neck portion. At least a portion of the pocket is bounded by an inner surface of the neck portion. The hydraulic surge dampener forms at least one passage that extends from the pocket, through the neck portion via an opening in the inner surface, and exits the neck portion via an opening in an outer surface of the neck portion that faces away from the inner surface.

According to one embodiment, a hydraulic head includes a body, a bore, and a hydraulic surge dampener. The bore extends through the body along an axis, and the body includes a shoulder portion and a neck portion. The shoulder portion has a first cross-sectional dimension measured in a first direction that is perpendicular to the axis. The neck portion extends out from the shoulder portion along a second direction that is parallel to the axis, and the neck portion has a second cross-sectional dimension measured in the first direction, wherein the second cross-sectional dimension is less than the first cross-sectional dimension. The hydraulic surge dampener forms at least one passage that extends from the bore, through the neck portion via an opening in an inner surface of the neck portion, and exits the neck portion via an opening in an outer surface of the neck portion. At least a portion of the bore is bounded by the inner surface of the neck portion, and the outer surface faces away from the bore.

According to one embodiment, a high pressure pump includes a hydraulic chamber, a hydraulic piston, and a hydraulic head. The hydraulic chamber has at least one port that provides entry for hydraulic fluid into an interior cavity of the hydraulic chamber. The hydraulic piston is movable within the interior cavity along a first direction and a second direction that is opposite the first direction.

The hydraulic piston includes a piston body that extends along a piston axis from a front piston surface of the piston body to a rear piston surface of the piston body. The piston axis is parallel to the first direction and the second direction, and the piston body includes a piston shoulder portion and a piston neck portion. The piston shoulder portion has a first cross-sectional dimension measured in a third direction that is perpendicular to the piston axis. The piston neck portion extends out from the piston shoulder portion along the first direction, and the piston neck portion has a second cross-sectional dimension measured in the third direction, wherein the second cross-sectional dimension is less than the first cross-sectional dimension.

The hydraulic piston includes a pocket extends into the piston neck portion along the second direction, and the pocket enters the piston neck portion through an opening in the front piston surface, which is spaced from the piston shoulder portion in the first direction by the piston neck portion. At least a portion of the pocket bounded by an inner surface of the piston neck portion.

The hydraulic head includes a head body and a bore that extends through the head body along a head axis, and the head body includes a head shoulder portion and a neck shoulder portion. The head shoulder portion has a third cross-sectional dimension measured in the third direction. The head neck portion extends out from the head shoulder portion along the second direction, and the head neck portion has a fourth cross-sectional dimension measured in the third direction, wherein the fourth cross-sectional dimension is less than the third cross-sectional dimension.

The hydraulic surge dampener forms either a first passage that extends from the pocket, through the piston neck portion via an opening in the inner surface of the piston neck portion, and exits the piston neck portion via an opening in an outer surface of the piston neck portion that faces away from the inner surface of the piston neck portion, or a second passage that extends from the bore, through the head neck portion via an opening in an inner surface of the head neck portion, and exits the head neck portion via an opening in an outer surface of the head neck portion that faces away from the bore, or both the first passage and the second passage.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Unless the context requires otherwise, throughout the specification and claims which follow, the word “comprise” and variations thereof, such as, “comprises” and “comprising” are to be construed in an open, inclusive sense, that is as “including, but not limited to.”

Reference throughout this specification to “one embodiment” or “an embodiment” means that a particular feature, structure or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

As used in this specification and the appended claims, the singular forms “a,” “an,” and “the” include plural referents unless the content clearly dictates otherwise. It should also be noted that the term “or” is generally employed in its sense including “and/or” unless the content clearly dictates otherwise.

Reference herein to two elements “facing” or “facing toward” each other indicates that a straight line can be drawn from one of the elements to the other of the elements without contacting an intervening solid structure. The term “aligned” as used herein in reference to two elements along a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein. All methods described herein can be performed in any suitable order unless otherwise indicated herein or otherwise clearly contradicted by context.

The headings and Abstract of the Disclosure provided herein are for convenience only and do not interpret the scope or meaning of the embodiments.

Figure 1:
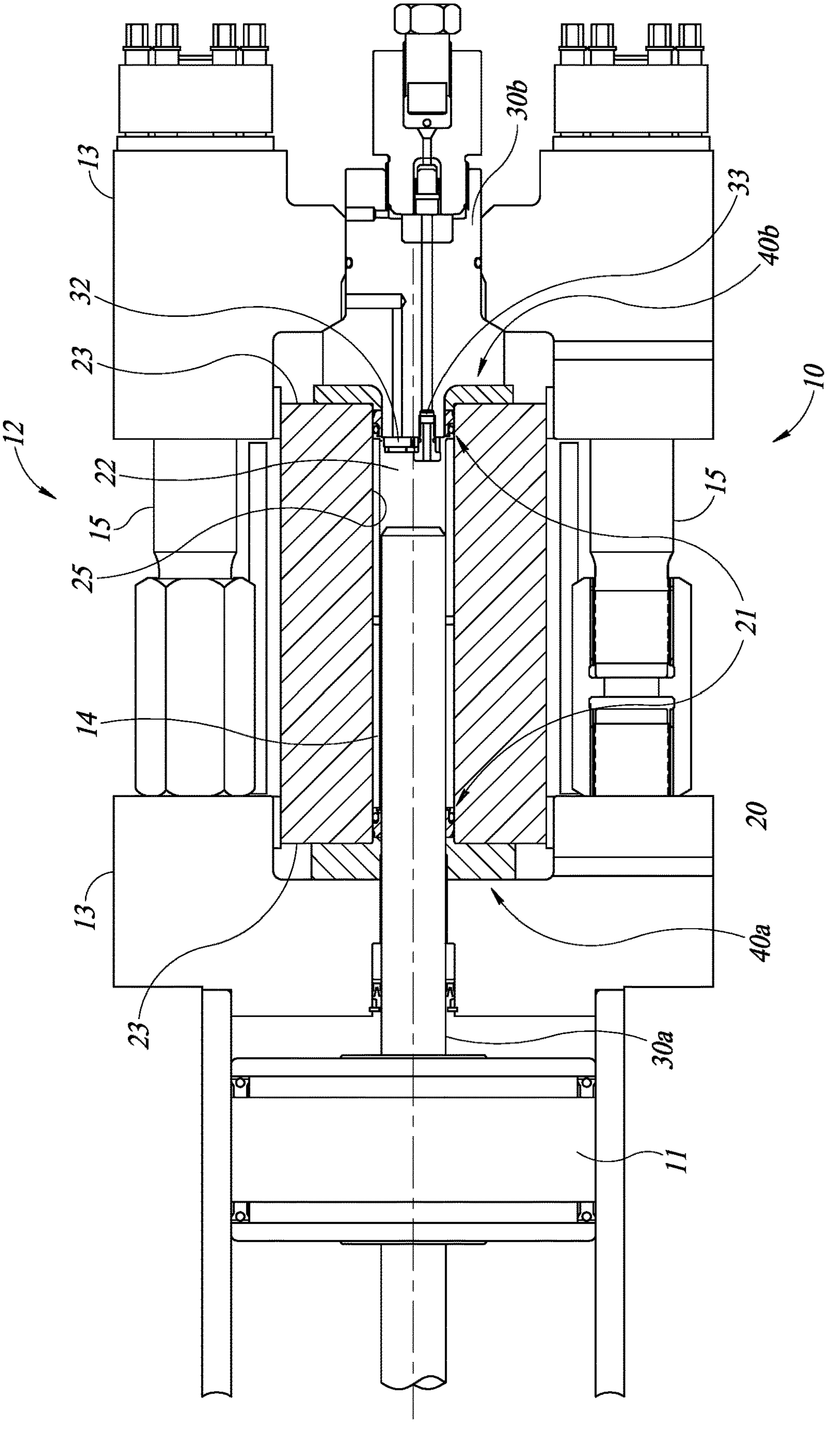
FIG. 1 (PRIOR ART)
FIG. 1 is a partial cross-sectional, side view of a known high pressure pump.
Figure 2:
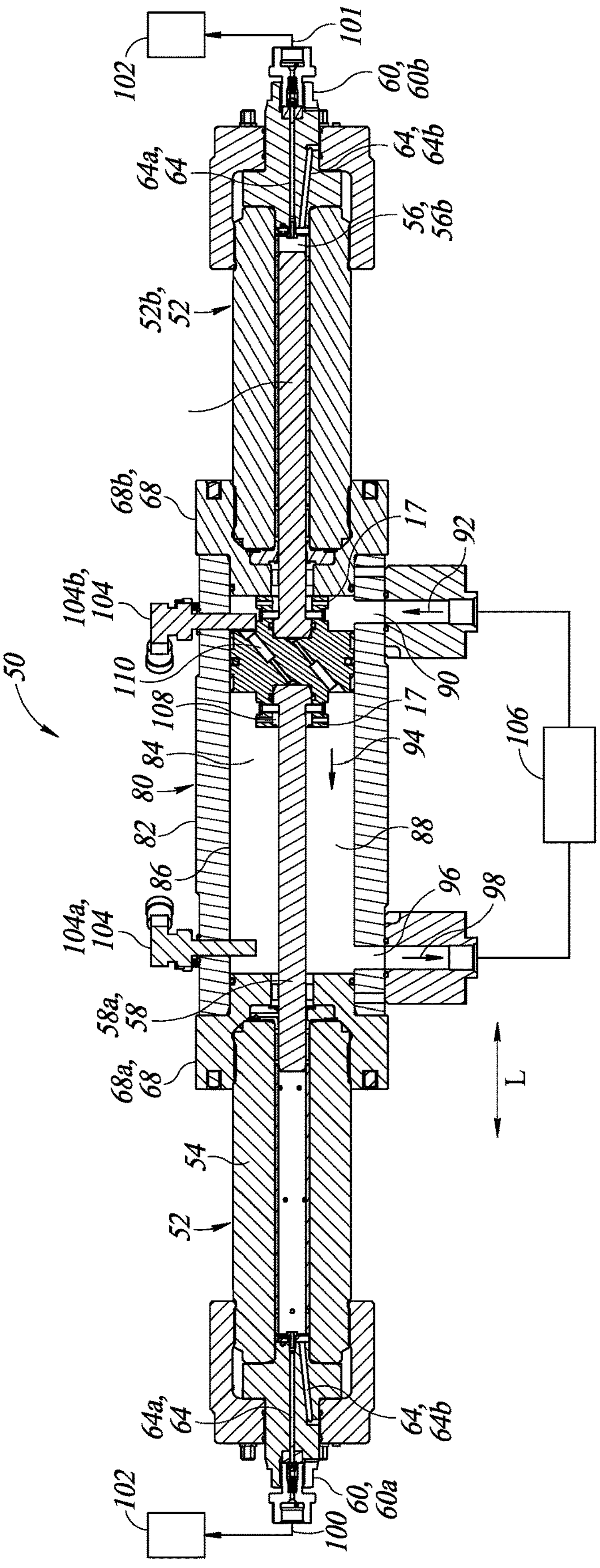
FIG. 2 is a cross-sectional, side view of a high pressure pump according to one embodiment, showing a hydraulic piston at a first position within a hydraulic pressure chamber.
Figure 3:
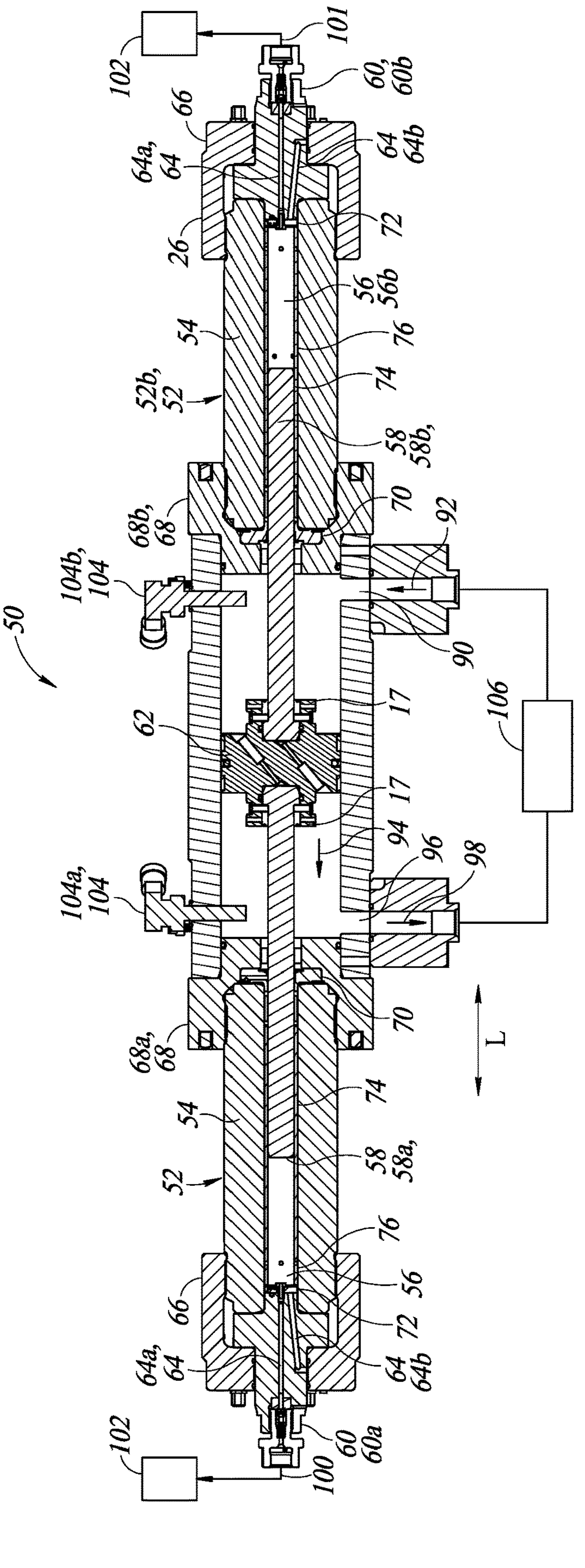
FIG. 3 is a cross-sectional, side view of the high pressure pump illustrated in FIG. 2, showing the hydraulic piston at a second position within the hydraulic pressure chamber.
Figure 4:
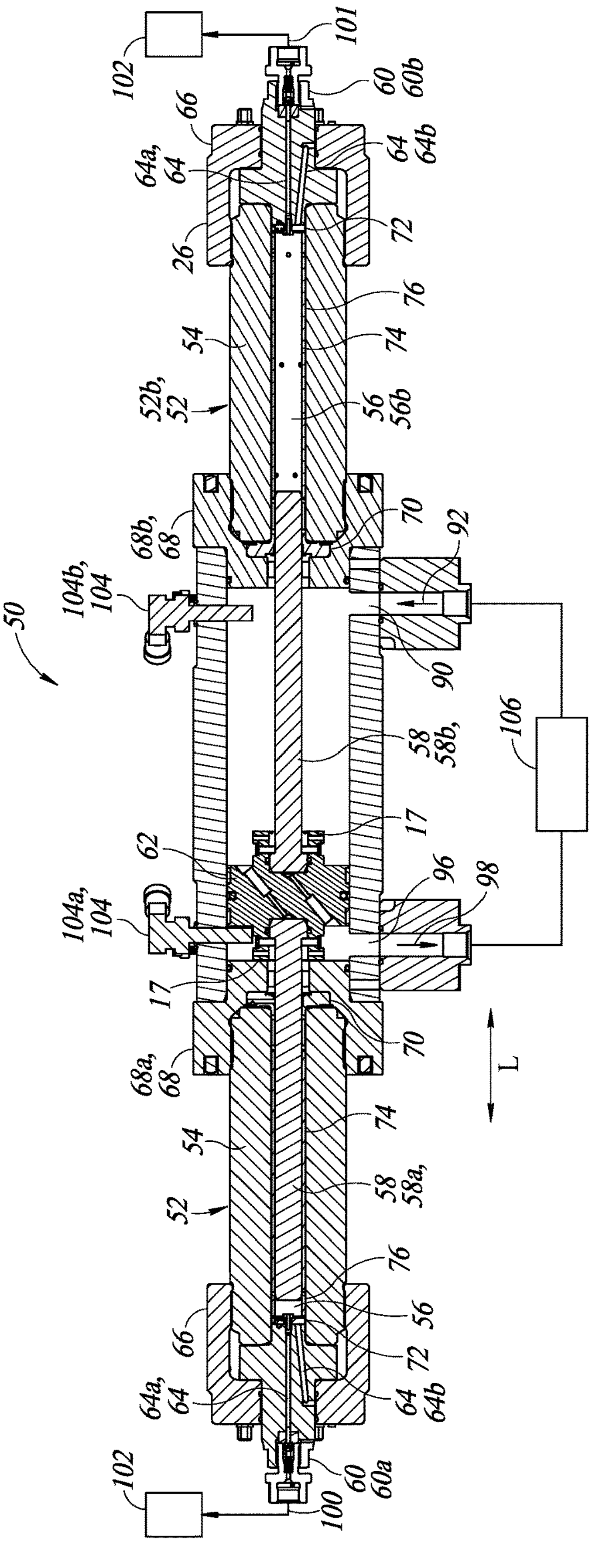
FIG. 4 is a cross-sectional, side view of the high pressure pump illustrated in FIG. 2, showing the hydraulic piston at a third position within the hydraulic pressure chamber.

Referring to FIGS. 2 to 4, a high pressure pump 50 may include a pressure vessel 52 having a body 54 and a bore 56 extending through the pressure vessel 52 (e.g., along a length L of the pressure vessel 52). The high pressure pump may include a plunger 58 that extends into the bore 56 through one end of the bore 56, and the high pressure pump 50 may include a check valve assembly 60 that extends into the bore 56 through the other, opposite along the length L, end of the bore 56. The plunger 58 may reciprocate within the pressure vessel 52 to pressurize a fluid (e.g., water) in the bore 56. As shown, the plunger 58 may reciprocate along a direction that is parallel to the length L. The plunger 58 may be driven by a hydraulically actuated piston (e.g., a hydraulic piston 62) or alternatively by a mechanical actuator.

The check valve assembly 60 may include one or more check valves 64 (e.g., respective ones of the check valves 64 admitting unpressurized fluid into the pressure vessel 52, specifically the bore 56, during an intake stroke of the plunger 58, and allowing pressurized fluid to exit the pressure vessel 52 after a power stroke of the plunger 58). The high pressure pump 50 may include an end cap 66 that secures the check valve assembly 60 in position relative to the pressure vessel 52. Similarly, the high pressure pump 50 may include a hydraulic head 68 securable relative to the pressure vessel 52 opposite the check valve assembly 60 and the end cap 66 along the length L.

The high pressure pump 50 may include seals between components of the pump 50 to prevent fluid from leading from the pressure vessel 52. For example, the pump 50 may include a dynamic seal 70 that forms a liquid impermeable barrier between the pressure vessel 52 and the hydraulic head 68. The pump 50 may include a static seal 72 that forms a liquid impermeable barrier between the pressure vessel 52 and the check valve assembly 60. The static seal 72 may include respective passages into the bore 56 for the check valves 64 of the check valve assembly 60. The pump 50 may include a sleeve 74 adjacent an inner wall 76 of the pressure vessel 52, the sleeve 74 being positioned so as to act as a buffer between the reciprocating plunger 58 and the body 54 of the pressure vessel 52.

The high pressure pump 50 may be a double acting pump, (e.g., as shown in the illustrated embodiment). The double acting high pressure pump 50 may include a plurality of the plungers 58 and a plurality of pressure vessels 52, with respective ones of the plurality of the plungers 58 reciprocating within respective ones of the bores 56 of the plurality of pressure vessels 52. Alternatively, the high pressure pump 50 may be a single acting pump that includes only a single plunger 58 reciprocating within a bore 56 of a single pressure vessel 52.

As shown, the high pressure pump 50 may include a hydraulic pressure chamber 80. The hydraulic pressure chamber 80 may include a chamber body 82 and a bore 84 extending through the chamber body 82. As shown, the bore 84 may extend through the chamber body 82 along a length of the hydraulic pressure chamber 80, and the length of the hydraulic pressure chamber 80 may be parallel to the length L of the pressure vessel 52 when the hydraulic pressure chamber 80 is secured to the pressure vessel 52. An inner surface 86 of the hydraulic pressure chamber 80 may face the bore 84 and form an interior cavity 88 of the hydraulic pressure chamber 80.

The hydraulic pressure chamber 80 may include a first port 90 that provides passage for a hydraulic fluid (e.g., hydraulic oil) to enter interior cavity 88. As shown in FIG. 2, an amount of the hydraulic fluid may enter (e.g., be pumped into) the interior cavity 88 in the direction indicated by arrow 92. As the amount of the hydraulic fluid that enters the interior cavity 88 increases, the hydraulic piston 62 may be forced to move (e.g., translate within the interior cavity 88). As shown, the hydraulic fluid may enter the first port 90, which may be positioned to one side (e.g., the right side as illustrated) of the hydraulic piston 62. As the hydraulic fluid enters the first port 90, the hydraulic fluid pushes the hydraulic piston 62 (e.g., to the left as indicated by arrow 94).

The hydraulic pressure chamber 80 may include a second port 96 that provides passage for the hydraulic fluid to exit the interior cavity 88. As shown in FIG. 3, an amount of the hydraulic fluid may exit (e.g., be pushed out of) the interior cavity 88 via the second port 96 in the direction indicated by arrow 98.

The plunger 58 (e.g., a first plunger 58*a*) may be carried by the hydraulic piston 62 such that movement of the hydraulic piston 62 results in corresponding movement of the first plunger 58*a*. As shown, the first plunger 58*a* may pass through the bore 56 (e.g., a first bore 56*a*) of the pressure vessel 52 (e.g., a first pressure vessel 52*a*). As the first plunger 58*a* advances within the first bore 56*a*, fluid (e.g., water) within the first bore 56*a* is pressurized and exits via one of the check valves 64 (e.g., a first check valve 64*a*) of the check valve assembly 60 (e.g., a first check valve assembly 60*a*).The pressurized fluid may then exit the high pressure pump 50 (e.g., as indicated by arrow 100) and be delivered to a system 102 (e.g., a waterjet cutting head) that uses the pressurized water (e.g., to form a waterjet that processes a workpiece).

In the embodiment in which the high pressure pump 50 is a double acting pump, a second plunger 58*b* may be carried by the hydraulic piston 62 such that movement of the hydraulic piston 62 results in corresponding movement of the second plunger 58*b*. As shown, the second plunger 58*b* may withdraw through a second bore 56*b* of a second pressure vessel 52*b*). As the second plunger 58*b* withdraws through the second bore 56*b*, fluid (e.g., water) enters the second bore 56*b* via one of the check valves 64 (e.g., a second check valve 64*b*) of the check valve assembly 60 (e.g., a second check valve assembly 60*b*).

The high pressure pump 50 may include a proximity sensor 104 that senses the hydraulic piston 62 as the hydraulic piston 62 approaches the end of a stroke (e.g., a power stroke for the first pressure vessel 52*a* as shown in FIG. 4). According to one embodiment, when the proximity sensor

104 senses the arrival of the hydraulic piston 62 the high pressure pump 50 changes (e.g., reverses) the direction of movement of the hydraulic piston 62. According to one embodiment, the high pressure pump 50 includes a direction control valve 106 that changes the direction of flow of the hydraulic fluid. For example, during the power stroke of the first pressure vessel 52*a*, the hydraulic fluid may enter the first port 90 (e.g., into a first portion of the interior cavity 88 that is "behind" the hydraulic piston 62 with respect to the direction of movement of the hydraulic piston 62). As the hydraulic piston 62 approaches the end of the power stroke for the first pressure vessel 52*a*, the proximity sensor 104 (e.g., a first proximity sensor 104*a*) may detect the hydraulic piston 62 and trigger the direction control valve 106 to change the direction of flow of the hydraulic fluid (e.g., to enter via the second port 96 into a second portion of the interior cavity 88 that is "in front of" the hydraulic piston 62 with respect to the direction of movement of the hydraulic piston 62 during the power stroke of the first pressure vessel 52*a*).

Due to the inertia of the moving hydraulic piston 62, the change in direction of movement of the hydraulic piston 62 may not be instant. Thus, during operation of the high pressure pump 50, the hydraulic piston 62 may impact another component of the high pressure pump that is adjacent the hydraulic piston 62 at the end of its stroke. As shown, the hydraulic head 68, for example a first hydraulic head 68*a* positioned between the first pressure vessel 52*a* and the hydraulic pressure chamber 80, may be impacted by the hydraulic piston 62.

Impact of the hydraulic piston 62 with another component of the high pressure pump 50 may result in hydraulic fluid (e.g., a portion of which may be trapped within a pocket 108 of the hydraulic piston 62) being subjected to a sudden pressure surge. This pressure surge may result in damage or failure of components of the high pressure pump 50 (e.g., locating pins, retaining springs, the plunger 58, etc.).

The hydraulic piston 62 may include one or more check valves 110 that provide passage for hydraulic fluid within the pocket 108 to pass through a portion of the hydraulic piston 62 and exit into a portion of the interior cavity 88 opposite the pocket 108 (i.e., the portion of the interior cavity 88 that is "behind" the hydraulic piston 62 with respect to its direction of movement, or the portion of the interior cavity 88 between the hydraulic piston 62 and a second hydraulic head 68*b*. However, the check valve 110 may be insufficient to prevent damage caused by impact of the hydraulic piston 62 with another component of the high pressure pump 50. Additionally, the check valve 110 may become damaged, which may greatly increase the risk of damage to the high pressure pump 50 caused by impact of the hydraulic piston 62. The hydraulic piston 62, according to one embodiment, may be devoid of the check valve 110.

The high pressure pump 50 may include one or more hydraulic surge dampeners 17 that may reduce or eliminate the sudden pressure surge described above and the potential damage associated with such a sudden pressure surge. After the change in direction of the hydraulic piston 62 is complete (i.e., such that the hydraulic piston 62 travels away from the first hydraulic head 68*a* and the first pressure vessel 52*a*, and (when the high pressure pump 50 is a double acting pump) travels towards the second hydraulic head 68*b* and the second pressure vessel 52*b*. As the hydraulic piston 62 travels away from the first hydraulic head 68*a* (or the hydraulic head 68 when the high pressure pump 50 is a single acting pump), the first plunger 58*a* withdraws from the first bore 56*a* of the first pressure vessel 52*a*.

During the withdrawal of the first plunger 58*a* from the first pressure vessel 52*a*, low pressure fluid (e.g., water) may enter the first bore 56*a* (e.g., via the second check valve 64*b* of the first check valve assembly 60*a*). As the hydraulic piston 62 advances towards the second pressure vessel 52*b*, the second plunger 58*b* advances within the second bore 56*b* thereby pressurizing fluid (e.g., water) within the second bore 56*b*. The pressurized fluid exits the second pressure vessel 52*b* via one of the check valves 64 (e.g., the first check valve 64*a*) of the second check valve assembly 60*b*. The pressurized fluid may then exit the high pressure pump 50 (e.g., as indicated by arrow 101) and be delivered to a system (e.g., the system 102) that uses the pressurized water.

The high pressure pump 50 may include a second proximity sensor 104*b* that senses the hydraulic piston 62 as the hydraulic piston 62 approaches the end of a stroke (e.g., a power stroke for the second pressure vessel 52*b* as shown in FIG. 2). According to one embodiment, when the second proximity sensor 104*b* senses the arrival of the hydraulic piston 62 the high pressure pump 50 changes (e.g., reverses) the direction of movement of the hydraulic piston 62 (e.g., via the direction control valve 106). For example, during the power stroke of the second pressure vessel 52*b*, the hydraulic fluid may enter the second port 96 (e.g., into the second portion of the interior cavity 88 that is "behind" the hydraulic piston 62 with respect to the direction of movement of the hydraulic piston 62). As the hydraulic piston 62 approaches the end of the power stroke for the second pressure vessel 52*b*, the second proximity sensor 104*b* may detect the hydraulic piston 62 and trigger the direction control valve 106 to change the direction of flow of the hydraulic fluid (e.g., to enter via the first port 90 into the first portion of the interior cavity 88 that is "in front of" the hydraulic piston 62 with respect to the direction of movement of the hydraulic piston 62 during the power stroke of the second pressure vessel 52*b*).

Referring to FIGS. 5 to 10, the hydraulic piston 62 of the high pressure pump 50 may include the hydraulic surge dampener 17. According to one embodiment, the hydraulic surge dampener 17 forms at least one passage 112 through a portion of a body 114 of the hydraulic piston 62. As shown, the body 114 may extend along an axis 116 (e.g., a central axis) from a front surface 117 of the body 114 to a rear surface 119 of the body 114. The front surface 117 and the rear surface 119 may face in opposite directions (e.g., the front surface 117 may face in one direction along which the hydraulic piston 62 reciprocates, and the rear surface 119 may face in the other direction along which the hydraulic piston 62 reciprocates).

According to one embodiment, the passage 112 extends along a direction (e.g., a first direction D1) that is angularly offset (i.e., non-parallel) with respect to the direction along which the hydraulic piston 62 reciprocates within the hydraulic pressure chamber 80 (e.g., a second direction D2). The first direction D1 and the second direction D2 may be angularly offset by an angle greater than zero degrees. According to one embodiment, the first direction D1 and the second direction D2 may be angularly offset by an angle greater than thirty degrees. According to one embodiment, the first direction D1 and the second direction D2 may be angularly offset by an angle greater than seventy-five degrees. According to one embodiment, the first direction D1 and the second direction D2 may be perpendicular or angularly offset by about ninety degrees (e.g., between 85 degrees and 95 degrees).

According to one embodiment, the hydraulic piston 62 may be radially symmetrical about the central axis 116. As shown the central axis 116 may be parallel to the second direction D2. The hydraulic piston 62, according to one embodiment, may include a neck portion 118 that has a first cross-sectional dimension J1 that is less than a second cross-sectional dimension J2 of a shoulder portion 120 of the hydraulic piston 62. The first cross-sectional dimension J1 and the second cross-sectional dimension J2 may each be measured along a direction perpendicular to one or both of the central axis 116 and the second direction D2. As shown, the first cross-sectional dimension J1 and the second cross-sectional dimension J2 may each be measured along the first direction D1.

The pocket 108 may enter the neck portion 118 through an opening 121 (e.g., formed in the front surface 117). The front surface 117 may be spaced from the shoulder portion 120 along the length of the hydraulic piston 62 (e.g., in a direction parallel to the second direction D2) by the neck portion 118. The opening 121 may face in a direction that is parallel to a direction of travel of the hydraulic piston 62 while it reciprocates within the hydraulic pressure chamber 80.

As shown, the check valve 110 may form a passage that extends from the pocket 108, through the shoulder portion 120 (e.g., entering via an opening 123 in a base surface 125 at which the pocket 108 terminates), and exits the body 114 (e.g., the shoulder portion 120) via an opening 131 in a rear surface 133 of the shoulder portion 120 that faces away from the neck portion 118.

As shown, the hydraulic piston 62 may be a double acting piston that includes the shoulder portion 120 positioned between two neck portions 118 that each extend out from the shoulder portion 120 in opposite directions. Alternatively, the hydraulic piston 62 may be a single acting piston that includes only one neck portion 118 extending out from the shoulder portion 120. The description herein of the hydraulic piston 62 refers to both single acting and double acting pistons, unless specified to the contrary.

The neck portion 118 may include an inner surface 122 that forms or bounds at least a portion of the pocket 108. The pocket 108 may extend into the body 114 of the hydraulic piston 62 and terminate therewithin. The pocket 108 may be sized to receive a portion of the plunger 58. The plunger 58 may be secured within the pocket 108 (e.g., via one or more fasteners 126 (e.g., pins, screws, rivets, etc.) inserted through respective fastener receiving holes 128.

The passage 112 formed by the hydraulic surge dampener 17 may extend from the inner surface 122, through the neck portion 118 (e.g. entering via an opening 127 in the inner surface 122), and exit the body 114 of the hydraulic piston 62 through an outer surface 124 of the neck portion 118 (e.g., exiting via an opening 129 in the outer surface 124). As shown, the outer surface 124 may be opposite the inner surface 122 such that the outer surface 124 faces away from the pocket 108 (e.g., with respect to the first direction D1). The respective passages 112 formed by the through holes 130 may be linear, or they may be non-linear (e.g., curved, or including multiple angularly offset linear segments). According to one embodiment, the through holes 130 may be linear such that a radial ray extending perpendicularly from the axis 116 intersects both the opening 127 in the inner surface 122 and the opening 129 in the outer surface 124 of one of the at least one passages 112.

Figure 5:
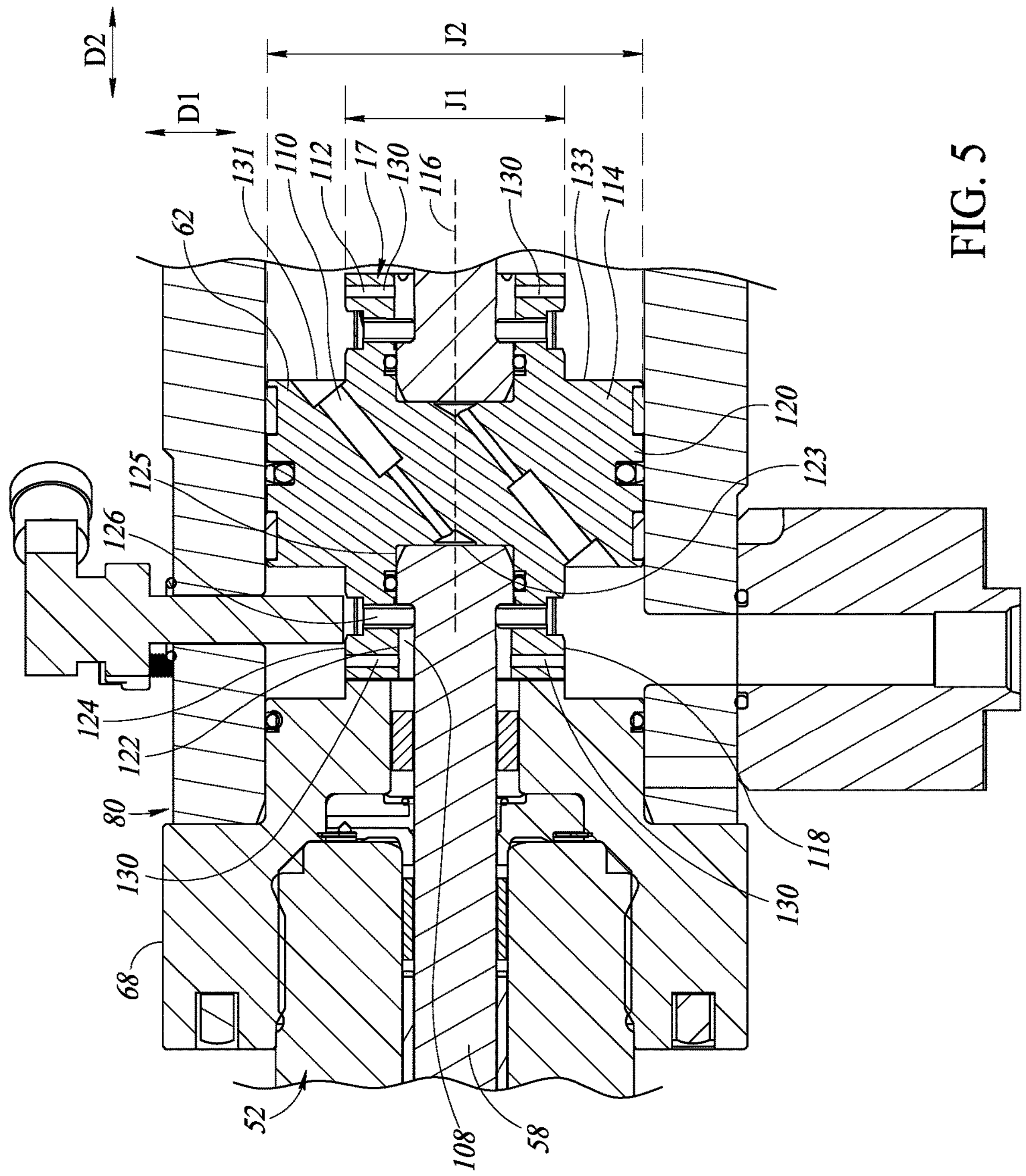
FIG. 5 is an enlarged, cross-sectional, side view of a portion of the high pressure pump illustrated in FIG. 2, showing the hydraulic piston at the third position within the hydraulic pressure chamber.
Figure 6:
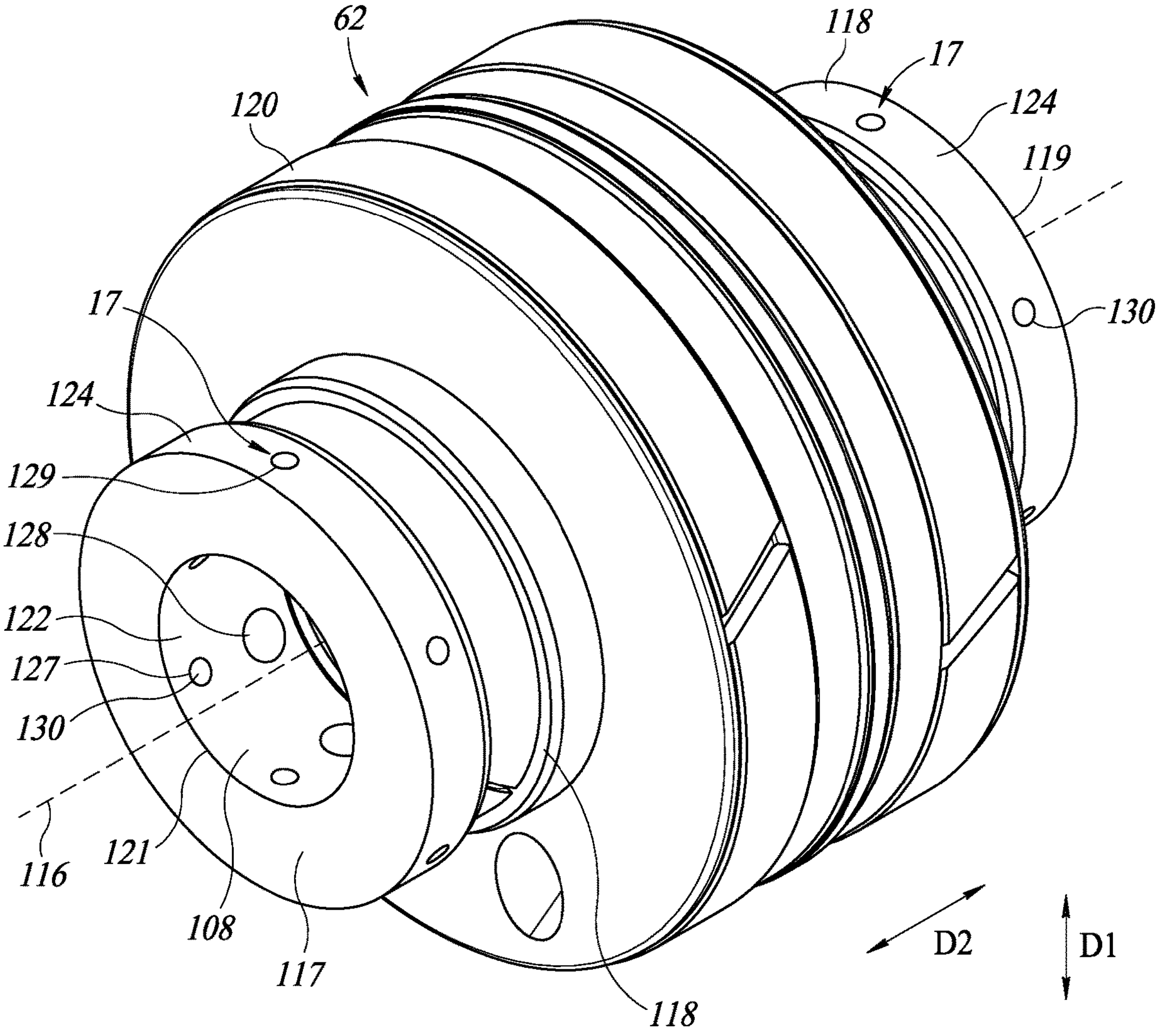
FIG. 6 is an isometric view of the hydraulic piston illustrated in FIG. 2, according to one embodiment.

As shown in FIGS. 5 and 6, the hydraulic surge dampener 17 may include one or more through holes 130 that extend from the inner surface 122, through the neck portion 118, and exit through the outer surface 124. Thus, the hydraulic piston 62 (e.g., the neck portion 118) may include a first number (i.e., one or more) of through holes (e.g., the through holes 130) and a second number (i.e., one or more) of through holes (e.g., the fastener receiving holes 128). According to one embodiment, the opening 127 may be a shape (e.g., a circle, oval, polygonal shape, etc.) with a closed perimeter. Similarly, the opening 129 may be a shape (e.g., a circle, oval, polygonal shape, etc.) with a closed perimeter. Thus, the passage 112 formed by the through hole 130 may be an enclosed passage that is entirely surrounded by the body 114 (e.g., the neck portion 118) of the hydraulic piston 62.

The first number of through holes may be a different size (e.g., smaller as shown, or larger) than the second number of through holes. The first number of through holes may be radially spaced (e.g., equidistantly from adjacent ones) about the central axis 116 at a first position along the length of the hydraulic piston 62. The second number of through holes may be radially spaced (e.g., equidistantly from adjacent ones) about the central axis 116 at a second position along the length of the hydraulic piston 62. For example each of the first number of through holes may be farther from the shoulder portion 120 than each of the second number of through holes is from the shoulder portion 120. According to one embodiment, the first number of through holes may extend through a portion of the neck portion 118 with a cross-sectional diameter that is different from (e.g., larger than as shown, or smaller than) a cross-sectional diameter of a portion of the neck portion 118 through which the second number of through holes extends through.

Figure 7:
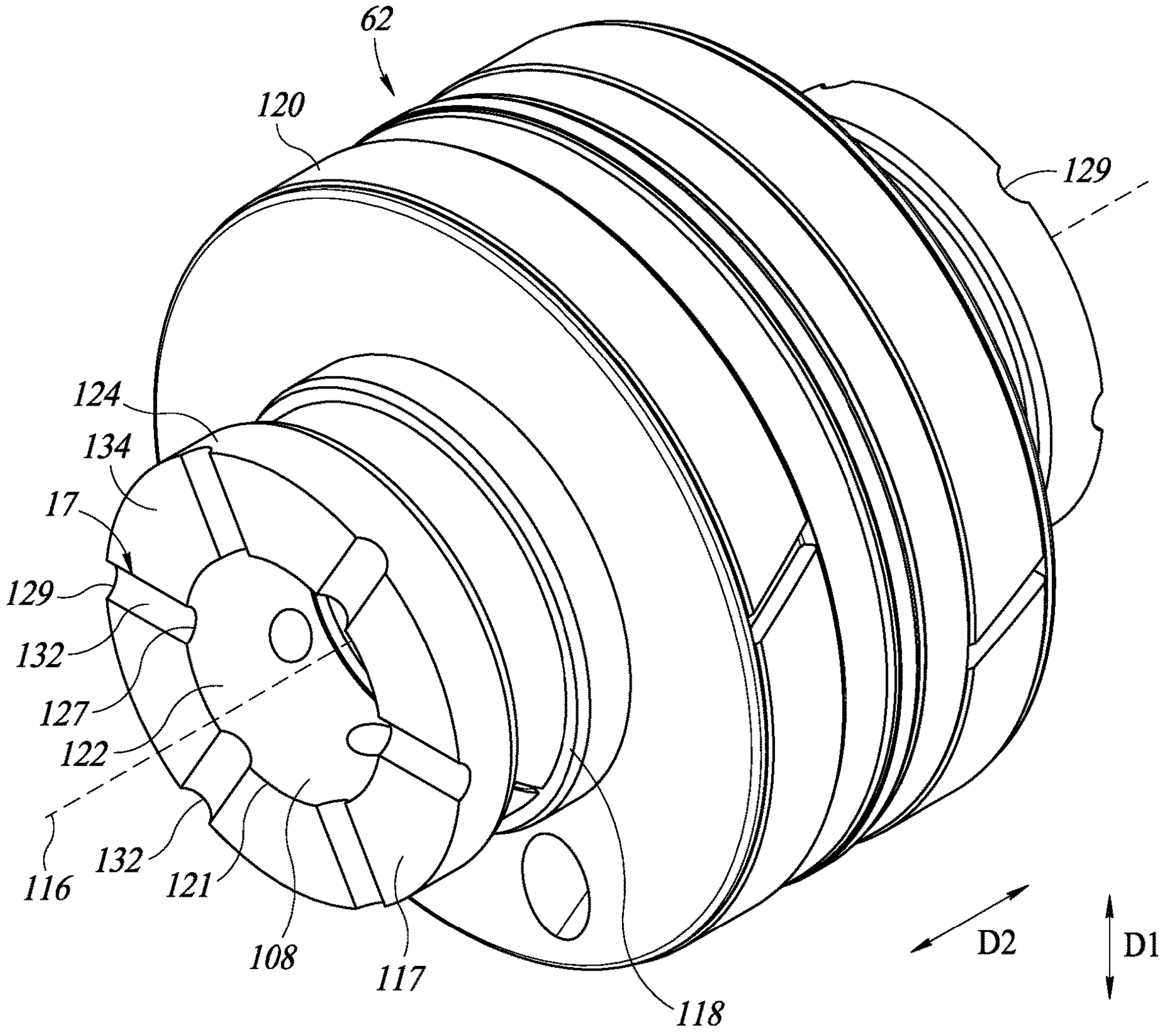
FIG. 7 is an isometric view of the hydraulic piston illustrated in FIG. 2, according to one embodiment.
Figure 8:
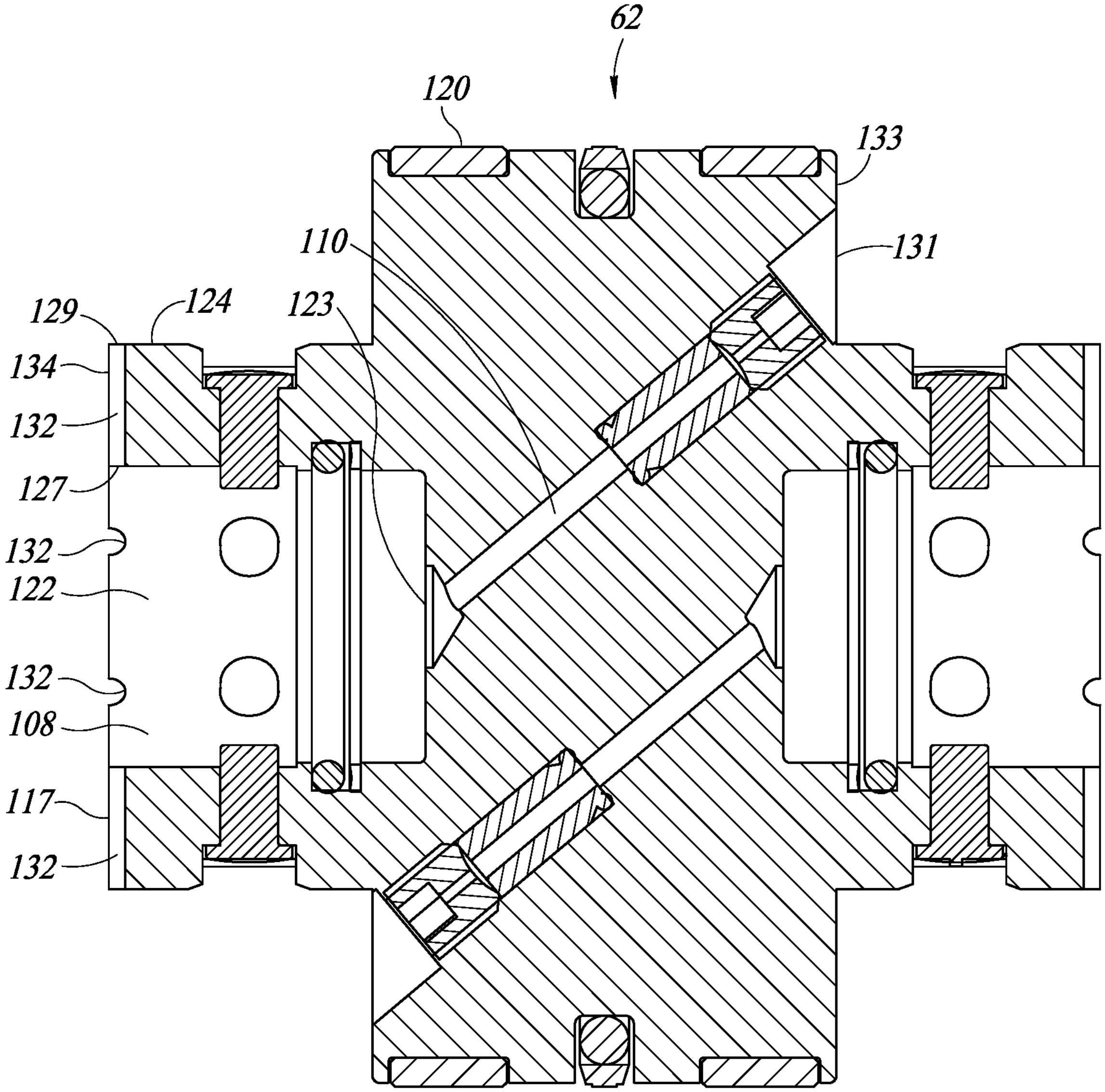
FIG. 8 is a cross-sectional, side view of the hydraulic piston illustrated in FIG. 7.

As shown in FIGS. 7 and 8, the hydraulic surge dampener 17 may include one or more grooves 132 in a surface 134 (e.g., the front surface 117) of the hydraulic piston 62. The one or more grooves 132 may include a plurality of the grooves 132 that may be radially spaced (e.g., equidistantly from adjacent ones) about the central axis 116. The surface 134 may form an end of the hydraulic piston 62 (e.g., the hydraulic piston 62 may be devoid of a portion that extends beyond the surface 134 with respect to one component of the second direction D2). The surface 134 may be part of the neck portion 118 and positioned such that the neck portion 118 is devoid of any portion farther from the shoulder portion 120 than the surface 134.

When the hydraulic piston 62 is mounted within the hydraulic pressure chamber 80, the surface 134 may be closer to the hydraulic head 68 than any other portion of the hydraulic piston 62. The surface 134 may be the "leading surface" with respect to the direction of movement of the hydraulic piston 62 during at least a portion of a stroke of the plunger 58.

The surface 134 may be flat (e.g., normal with respect to the second direction D2), with the exception of the one or more grooves 132. Similar to the one or more through holes 130 described above, each of the one or more grooves 132 may form respective passages 112 extending from the inner surface 122, through/across the neck portion 118, and exiting the body 114 of the hydraulic piston 62 through the outer surface 124 of the neck portion 118. The grooves 132 may be linear, as shown, or they may be non-linear (e.g., curved, or including multiple angularly offset linear segments). According to one embodiment, the grooves 132 may be linear such that a radial ray extending perpendicularly from the axis 116 intersects both the opening 127 in the inner surface 122 and the opening 129 in the outer surface 124 of one of the at least one passages 112.

According to one embodiment, the opening 127 may be a shape (e.g., an arc, curve, series of linear segments, etc.) with an open perimeter. Similarly, the opening 129 may be a shape (e.g., an arc, curve, series of linear segments, etc.) with an open perimeter. Thus, the passage 112 formed by the groove 132 may be an open passage that is only partially (i.e., not entirely) surrounded by the body 114 (e.g., the neck portion 118) of the hydraulic piston 62.

Figure 9:
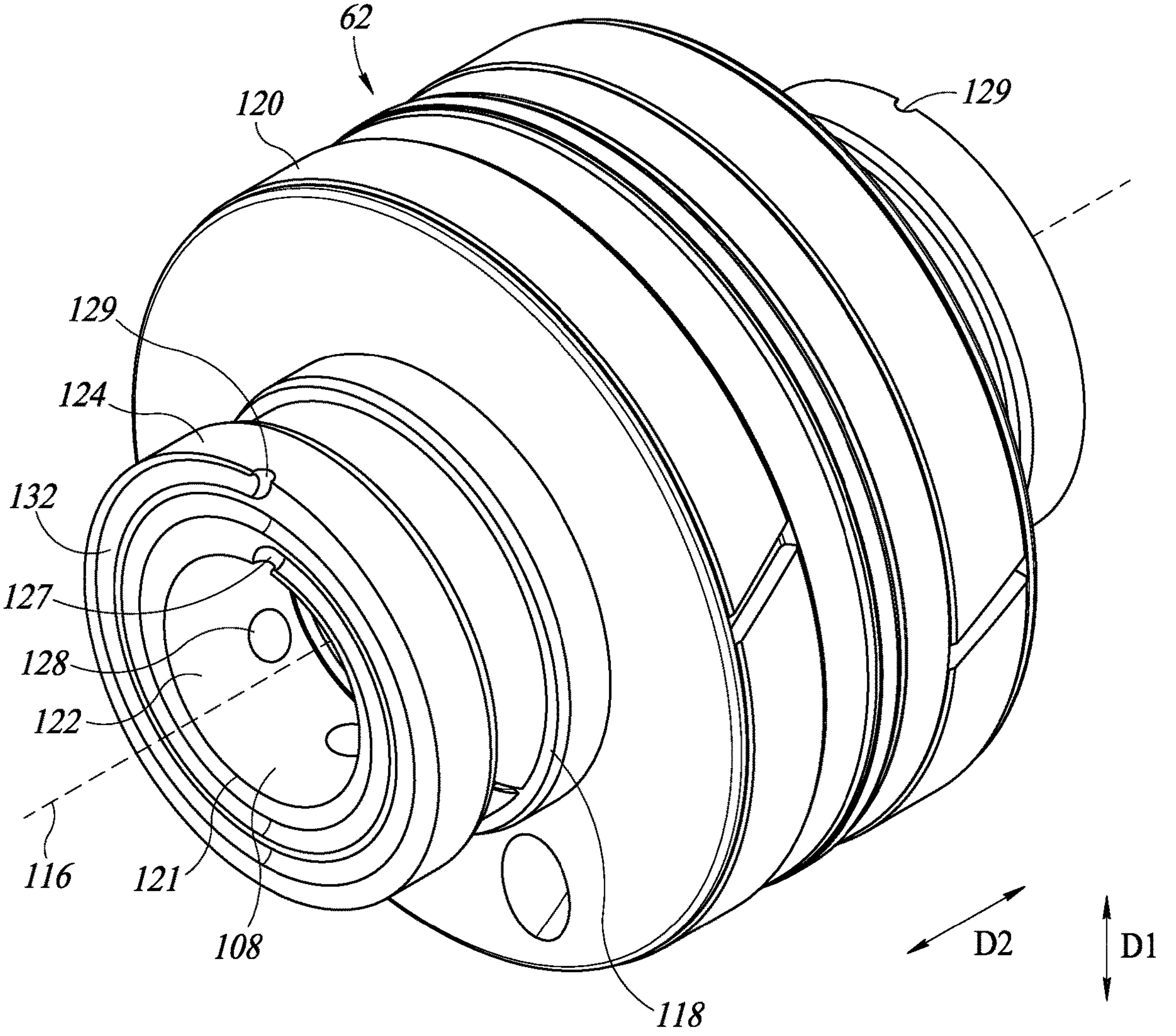
FIG. 9 is an isometric view of the hydraulic piston illustrated in FIG. 2, according to one embodiment.

As shown in FIG. 9, the hydraulic surge dampener 17 may include a single groove 132 in the surface 134. Rather than a direct path across the surface 134 connecting the inner surface 122 and the outer surface 124 (as shown in FIGS. 7 and 8), the groove 132 may include other shapes that provide an indirect path across the surface 134 connecting the inner surface 122 and the outer surface 124. For example, the groove 132 may be in the form of a spiral that completes a portion of a revolution about the central axis 116 (i.e., less than three-hundred sixty degrees). According to one embodiment, the groove 132 may be in the form of a spiral that completes at least one revolution about the central axis 116 (i.e., three-hundred sixty degrees or greater). As shown, the groove 132 may be in the form of a spiral that completes two revolutions about the central axis 116 (i.e., about seven-hundred twenty degrees).

Figure 10:
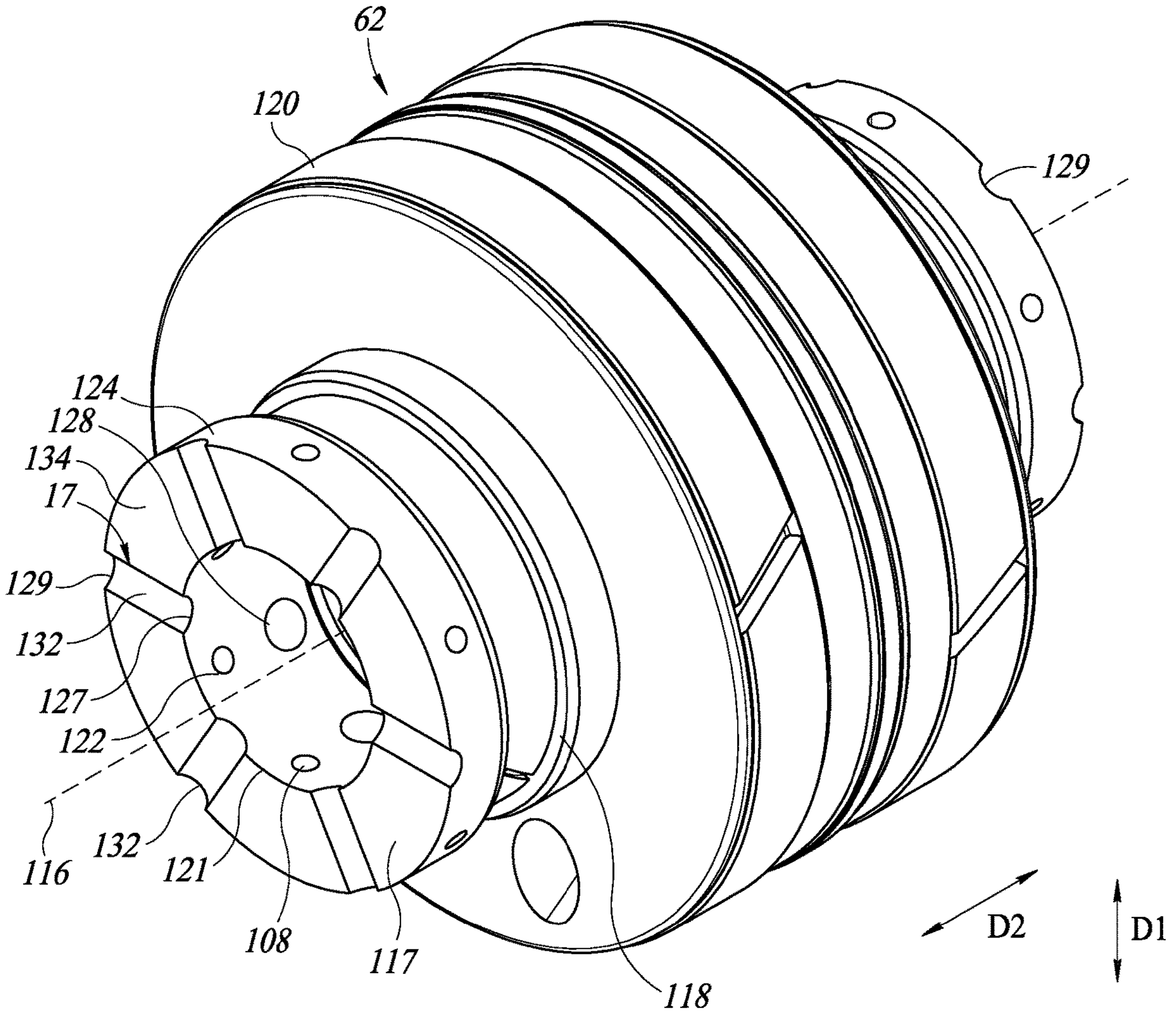
FIG. 10 is an isometric view of the hydraulic piston illustrated in FIG. 2, according to one embodiment.

As shown in FIG. 10, the hydraulic surge dampener 17 may include a combination of at least one through hole 130 and at least one groove 132.

Still referring to FIGS. 5 to 10, when the hydraulic piston 62 is a double acting piston with two neck portions 118, the body 114 of the hydraulic piston 62 may be symmetrical about a central plane that is normal to the second direction D2. The two neck portions 118 may include mirrored versions of the hydraulic surge dampener 17. Alternatively, the two neck portions 118 may include different versions of the hydraulic surge dampener 17 (e.g., one neck portion 118 may include the through holes 130 and the other neck portion 118 may include the grooves 132).

In operation, as the hydraulic piston 62 approaches the end of its stroke (i.e., transitions from movement in one direction to movement in the opposite direction), hydraulic fluid may be present in the pocket 108 of the approaching side of the hydraulic piston 62. As pressure inside the pocket 108 increases (e.g., due to impact or a near impact of the hydraulic piston 62 with another component of the high pressure pump 50, such as the hydraulic head 68), the hydraulic fluid present in the pocket 108 travels along the passage(s) 122 provided by the hydraulic surge dampener 17 to exit the pocket 108. The hydraulic fluid may exit the passage(s) 122 and enter the interior cavity 88 of the hydraulic pressure chamber 80, which the hydraulic fluid may exit (e.g., via the second port 96. The hydraulic fluid may exit the passage(s) 122 and enter the interior cavity 88 of the hydraulic pressure chamber 80, where the hydraulic fluid may assist in the transition of the direction of movement of the hydraulic piston 62.

Referring to FIGS. 2 and 11 to 14, according to one embodiment, the hydraulic surge dampener 17 may be part of other components of the high pressure pump 50 in addition to or instead of the hydraulic piston 62. As shown, the hydraulic head 68 may include the hydraulic surge dampener 17.

For example, a surface 136 may form an end of the hydraulic head 68 (e.g., the hydraulic head 68 may be devoid of a portion that extends beyond the surface 136 with respect to one component of the second direction D2). The surface 136 may be part of a neck portion 138 of the hydraulic head 68 (similar to the front surface 117 of the neck portion 118 of the hydraulic piston 62 as described above), as shown in FIGS. 11 and 12. The neck portion 138 may have a reduced cross-sectional dimension compared to a remainder of the hydraulic head 68 (e.g., a shoulder portion 142 of the hydraulic head 68). According to one embodiment, the cross-sectional dimension of the neck portion 138 may correspond closely to (e.g., match) the cross-sectional dimension of the neck portion 118 of the hydraulic piston 62.

The neck portion 138 may be positioned inside interior cavity 88 of the hydraulic pressure chamber 80 when the high pressure pump 50 is in operation. The hydraulic surge dampener 17 of the hydraulic head 68 may include one or more through holes 139 (e.g., similar to the through holes 130 as described above), as shown in FIGS. 11 and 13. The hydraulic surge dampener 17 of the hydraulic head 68 may include one or more grooves 140 (e.g., similar to the grooves 132 as described above), as shown in FIGS. 12 and 14. According to one embodiment, the hydraulic head 68 may include both one or more of the through holes 139 and one or more of the grooves 140 (e.g., similar to as shown in FIG. 10 of the hydraulic piston 62).

Figure 11:
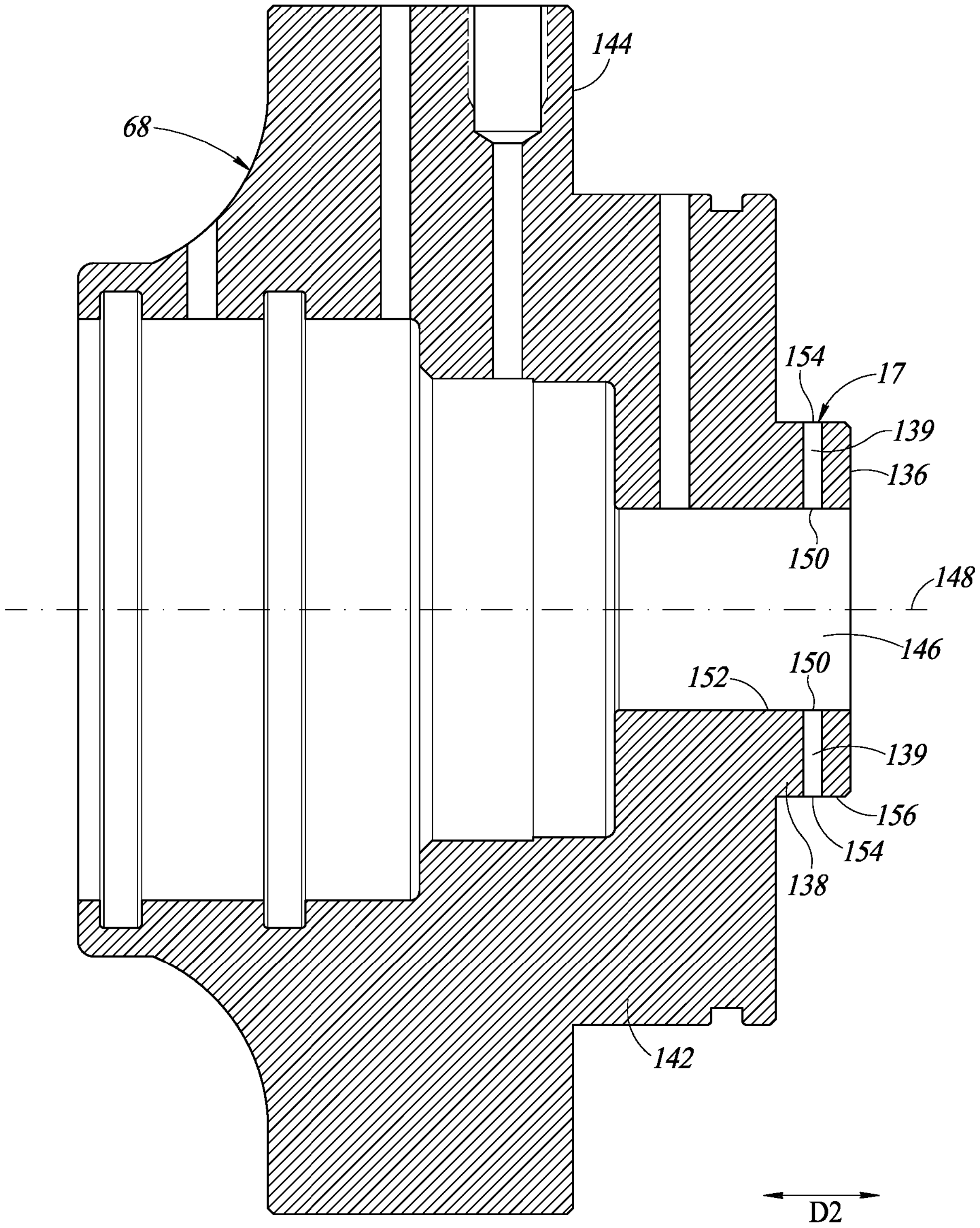
FIG. 11 is a cross-sectional, side view of a hydraulic head illustrated in FIG. 2, according to one embodiment.

Referring to FIG. 11, the hydraulic head 68 may include a body 144 and a bore 146 that extends through the body 144 along an axis 148. The hydraulic surge dampener 17 may form at least one passage that extends from the bore 146, through the neck portion 138 (e.g., via an opening 150 in an inner surface 152 of the neck portion 138), and exits the neck portion 138 via an opening 154 in an outer surface 156 of the neck portion 138. As shown in the illustrated embodiment, at least a portion of the bore 146 may be bounded by the inner surface 152 of the neck portion 138, and the outer surface 156 may face away from the bore 146 (e.g., radially with respect to the axis 148). As shown, the openings 150 and 154 may be a shape (e.g., a circle, oval, polygonal shape, etc.) with a closed perimeter.

Figure 12:
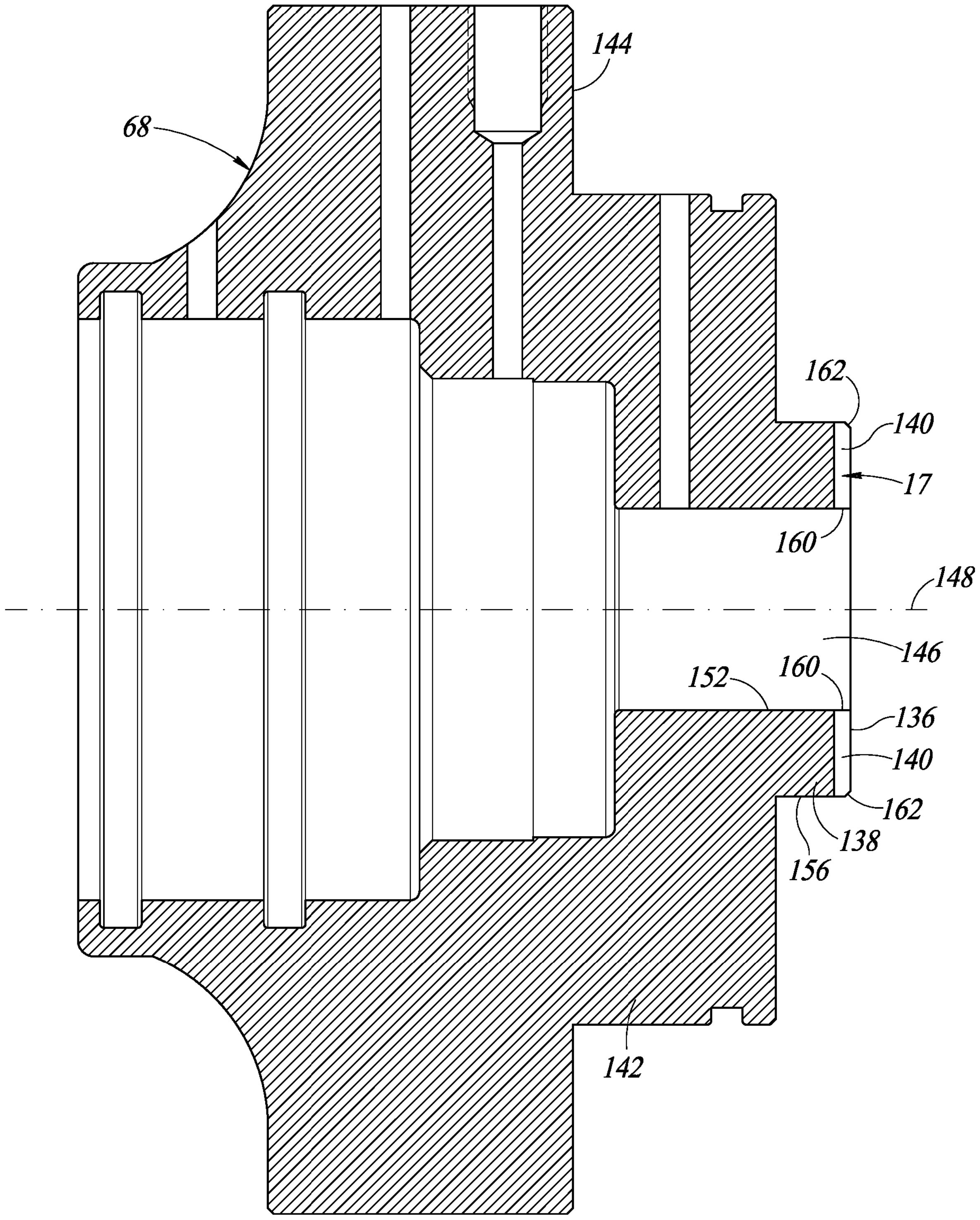
FIG. 12 is a cross-sectional, side view of a hydraulic head illustrated in FIG. 2, according to one embodiment.

Referring to FIG. 12, the hydraulic surge dampener 17 may form at least one passage that extends from the bore 146, through the neck portion 138 (e.g., via an opening 160 in the inner surface 152 of the neck portion 138), and exits the neck portion 138 via an opening 162 in the outer surface 156 of the neck portion 138. As shown in the illustrated embodiment, the hydraulic surge dampener 17 may include one or more of the grooves 140 (e.g., extending across at least a portion of the surface 136). As shown, the openings 160 and 162 may be a shape (e.g., an arc, curve, series of linear segments, etc.) with an open perimeter.

Figure 13:
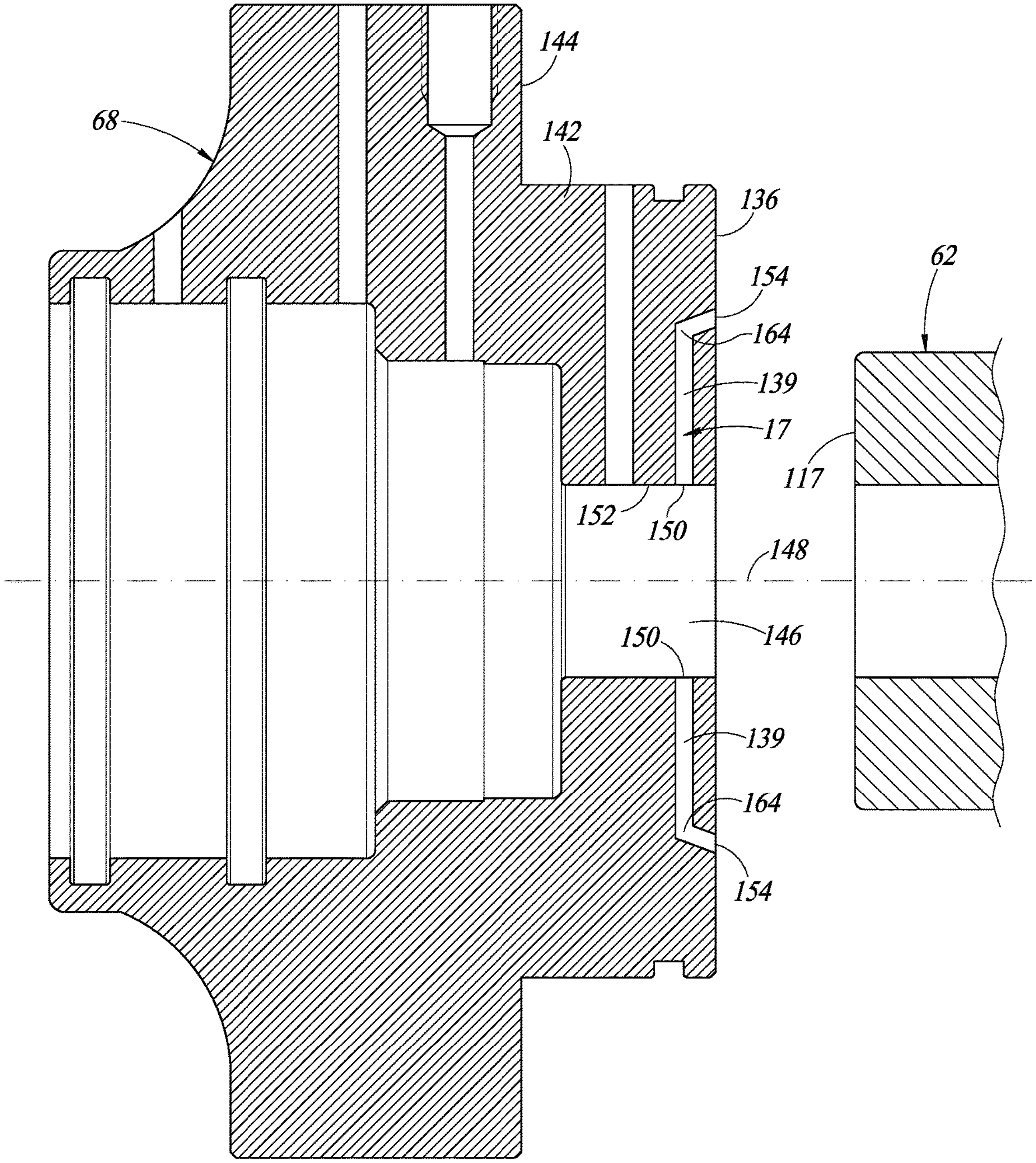
FIG. 13 is a cross-sectional, side view of a hydraulic head illustrated in FIG. 2, according to one embodiment.

Referring to FIG. 13, the hydraulic head 68 may be devoid of the neck portion 138. Thus, the surface 136 may be part of the shoulder portion 142 of the hydraulic head 68. According to one embodiment, the cross-sectional dimension of the shoulder portion 142 may be greater than the cross-sectional dimension of the neck portion 118 of the hydraulic piston 62. Thus, the one or more through holes 139 may include a bend 164 between the opening 150 and the opening 154. The opening 154 may be formed in the surface 136, and positioned (e.g., radially spaced from the axis 148) such that the opening 154 is not blocked by the hydraulic piston 62 (e.g., when the front surface 117 of the hydraulic piston 62 contacts the surface 136 of the hydraulic head 68).

Figure 14:
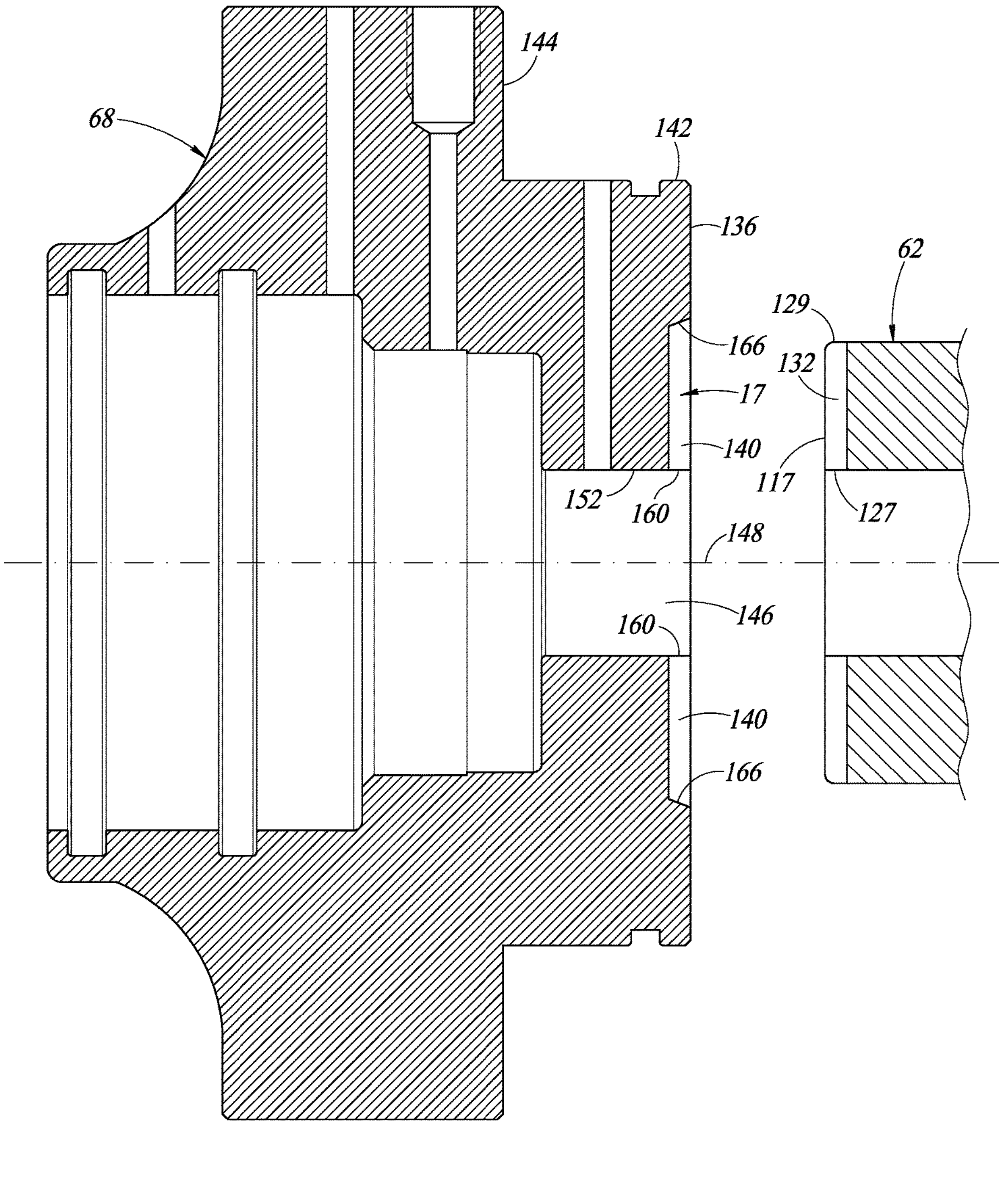
FIG. 14 is a cross-sectional, side view of a hydraulic head illustrated in FIG. 2, according to one embodiment.

Referring to FIG. 14, the hydraulic head 68 may be devoid of the neck portion 138. Thus, the surface 136 may be part of the shoulder portion 142 of the hydraulic head 68. According to one embodiment, the cross-sectional dimension of the shoulder portion 142 may be greater than the cross-sectional dimension of the neck portion 118 of the hydraulic piston 62. Thus, the one or more grooves 140 may each include a respective terminal surface 166 at which each of the one or more grooves 140 ends (e.g., with respect to a radial direction extending from the axis 148). The terminal surface 166 may be positioned in the shoulder portion 142 so as to define a length of the groove 140. The length of the groove 140 may be long enough to extend (e.g., radially away from the axis 148) such that a portion of the groove 140 is not blocked by the hydraulic piston 62 (e.g., when the front surface 117 of the hydraulic piston 62 contacts the surface 136 of the hydraulic head 68).

According to one embodiment, both the hydraulic piston 62 and the hydraulic head 68 may include portions of the hydraulic surge dampener 17. The portions may include corresponding grooves 132 and 140 that are aligned with each other such that the grooves 132 and 140 cooperatively define the passages 112 when the hydraulic piston 62 impacts the hydraulic head 68. According to one embodiment, the portions of the hydraulic surge dampener 17 carried by the hydraulic piston 62 and the hydraulic head 68 may be offset or different such that they define separate passages 112.

Other components of the high pressure pump 50 (e.g., any component that directly faces or could come into contact with the reciprocating hydraulic piston 62) may include the hydraulic surge dampener 17 as described above.

Referring to FIGS. 1 to 14, the high pressure pump 50 may include the hydraulic pressure chamber 80 having at least one port (e.g., the port 90) that provides entry for hydraulic fluid into the interior cavity 88 of the hydraulic pressure chamber 80. The high pressure pump 80 may include a hydraulic piston (e.g., any of the embodiments of the hydraulic piston 62 as described herein or an embodiment of the hydraulic piston 62 that is devoid of the hydraulic surge dampener 17) movable within the interior cavity 88 along a first direction and a second direction that is opposite the first direction. The high pressure pump 50 may include a hydraulic head (e.g., any of the embodiments of the hydraulic head 68 as described herein, either with or without the hydraulic surge dampener 17). The high pressure pump 50 may include the hydraulic surge dampener 17 carried by the hydraulic piston (only), the hydraulic head (only), or both the hydraulic piston and the hydraulic head.

The high pressure pump 50 may include the hydraulic head 68 secured to the hydraulic pressure chamber 80 such that the neck portion 118 faces the neck portion 138. The high pressure pump 50 may include the hydraulic head 68 secured to the hydraulic pressure chamber 80 such that the neck portion 138 is positioned within the interior cavity 88. The high pressure pump 50 may include the hydraulic head 68 secured to the hydraulic pressure chamber 80 such that the axis 116 is coincident with the axis 148. According to one embodiment, the pocket 108 may be radially symmetrical about the axis 116, and the bore 146 may be radially symmetrical about the axis 148.

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The invention claimed is:

1. A hydraulic piston comprising:

a body that extends along an axis from a front surface of the body to a rear surface of the body, the body including:

a shoulder portion having a first cross-sectional dimension measured in a first direction that is perpendicular to the axis; and a first neck portion that extends out from the shoulder portion along a second direction that is parallel to the axis, the first neck portion having a second cross-sectional dimension measured in the first direction, wherein the second cross-sectional dimension is less than the first cross-sectional dimension;

a second neck portion that extends out from the shoulder portion along a third direction that is opposite the second direction, the second neck portion having a third cross-sectional dimension measured in the first direction, wherein the third cross-sectional dimension is less than the first cross-sectional dimension;

a first pocket that extends into the first neck portion along the third direction, the first pocket entering the first neck portion through an opening in the front surface, which is spaced from the shoulder portion by the first neck portion, at least a portion of the first pocket bounded by a first inner surface of the first neck portion, and the first pocket sized to receive a plunger therein;

a second pocket that extends into the second neck portion along the second direction, the second pocket entering the second neck portion through an opening in the rear surface, which is spaced from the shoulder portion by the second neck portion, at least a portion of the second pocket bounded by a second inner surface of the second neck portion, a hydraulic surge dampener that forms at least one passage that extends through the opening in the front surface and into the first pocket, through the first neck portion via a first opening in the first inner surface, and exits the first neck portion via a first opening in a first outer surface of the first neck portion that faces away from the first inner surface; and a fastener receiving through hole that extends through the first neck portion from a second opening in the first inner surface to a second opening in the first outer surface, wherein the hydraulic surge dampener forms at least one passage that extends from the second pocket, through the second neck portion via an opening in the second inner surface, and exits the second neck portion via an opening in a second outer surface of the second neck portion that faces away from the second inner surface.

2. The hydraulic piston of claim 1 wherein the hydraulic surge dampener includes at least one groove in the front surface, and the first opening in the first inner surface has an open shape perimeter.

3. The hydraulic piston of claim 2 wherein the groove is linear such that a radial ray extending perpendicularly from the axis intersects both the first opening in the first inner surface and the first opening in the first outer surface of one of the at least one passages.

4. The hydraulic piston of claim 2 wherein the at least one groove includes a plurality of grooves, and each of the plurality of grooves is equidistantly spaced from adjacent ones of the plurality of grooves.

5. The hydraulic piston of claim 1, further comprising:

a check valve that forms a passage that extends from the first pocket, through the shoulder portion via an opening in a base surface at which the first pocket terminates with respect to the third direction, and exits the shoulder portion via an opening in a rear surface of the shoulder portion that faces in the third direction and away from the first neck portion.

6. The hydraulic piston of claim 1 wherein the third cross-sectional dimension is equal to the second cross-sectional dimension.

7. The hydraulic piston of claim 1 wherein the hydraulic surge dampener includes at least one through hole, and the first opening in the first inner surface has a closed shape perimeter.

8. The hydraulic piston of claim 7 wherein the at least one through hole is linear such that a radial ray extending perpendicularly from the axis intersects both the opening in the first inner surface and the opening in the first outer surface of one of the at least one passages.

9. The hydraulic piston of claim 7 wherein the at least one through hole includes a plurality of through holes, and each of the plurality of through holes is equidistantly spaced from adjacent ones of the plurality of through holes.

10. The hydraulic piston of claim 1, further comprising:
a plunger positioned within the first pocket and secured relative to the body by a fastener inserted through the second opening in the first inner and outer surfaces,
wherein a portion of the at least one passage extends through the opening in the front surface and passes between the first inner surface and the plunger to enter the pocket.

11. A hydraulic piston comprising:
a body that extends along an axis from a front surface of the body to a rear surface of the body, the body including:
a shoulder portion having a first cross-sectional dimension measured in a first direction that is perpendicular to the axis; and
a neck portion that extends out from the shoulder portion along a second direction that is parallel to the axis, the neck portion having a second cross-sectional dimension measured in the first direction, wherein the second cross-sectional dimension is less than the first cross-sectional dimension;
a pocket that extends into the neck portion along a third direction, the pocket entering the neck portion through an opening in the front surface, which is spaced from the shoulder portion by the neck portion, at least a portion of the pocket bounded by an inner surface of the neck portion, and the pocket sized to receive a plunger therein;
a hydraulic surge dampener that forms at least one passage that extends through the opening in the front surface and into the pocket, through the neck portion via a first opening in the inner surface, and exits the neck portion via a first opening in an outer surface of the neck portion that faces away from the inner surface; and
a fastener receiving through hole that extends through the neck portion from a second opening in the inner surface to a second opening in the outer surface,
wherein a cross-sectional dimension of the fastener receiving through hole is different than a cross-sectional dimension of the first opening in the inner surface.

12. A hydraulic piston comprising:
a body that extends along an axis from a front surface of the body to a rear surface of the body, the body including:
a shoulder portion having a first cross-sectional dimension measured in a first direction that is perpendicular to the axis; and
a neck portion that extends out from the shoulder portion along a second direction that is parallel to the axis, the neck portion having a second cross-sectional dimension measured in the first direction, wherein the second cross-sectional dimension is less than the first cross-sectional dimension;
a pocket that extends into the neck portion along a third direction, the pocket entering the neck portion through an opening in the front surface, which is spaced from the shoulder portion by the neck portion, at least a portion of the pocket bounded by the inner surface of the neck portion, and the pocket sized to receive a plunger therein;
a hydraulic surge dampener that forms at least one passage that extends through the opening in the front surface and into the pocket, through the neck portion via a first opening in the inner surface, and exits the neck portion via a first opening in an outer surface of the neck portion that faces away from the inner surface; and
a fastener receiving through hole that extends through the neck portion from a second opening in the inner surface to a second opening in the outer surface,
wherein the first opening in the inner surface is positioned closer to the front surface than the second opening in the inner surface is from the front surface.

13. A hydraulic piston comprising:
a body that extends along an axis from a front surface of the body to a rear surface of the body, the body including:
a shoulder portion having a first cross-sectional dimension measured in a first direction that is perpendicular to the axis; and
a neck portion that extends out from the shoulder portion along a second direction that is parallel to the axis, the neck portion having a second cross-sectional dimension measured in the first direction, wherein the second cross-sectional dimension is less than the first cross-sectional dimension;
a pocket that extends into the neck portion along a third direction that is opposite the second direction, the pocket entering the neck portion through an opening in the front surface, which is spaced from the shoulder portion by the neck portion, at least a portion of the pocket bounded by an inner surface of the neck portion;
a hydraulic surge dampener that forms at least one passage that extends through the opening in the front surface and into the pocket, through the neck portion via an opening in the inner surface, and exits the neck portion via an opening in an outer surface of the neck portion that faces away from the inner surface; and
a plunger positioned within the pocket and secured relative to the body such that a portion of the at least one passage extends through the opening in the front surface and passes between the inner surface and the plunger to enter the pocket.

14. The hydraulic piston of claim 13 wherein the hydraulic surge dampener includes at least one groove in the front surface, and the opening in the inner surface has an open shape perimeter.

15. The hydraulic piston of claim 14 wherein the groove is linear such that a radial ray extending perpendicularly from the axis intersects both the opening in the inner surface and the opening in the outer surface of one of the at least one passages.

16. The hydraulic piston of claim 14 wherein the at least one groove includes a plurality of grooves, and each of the plurality of grooves is equidistantly spaced from adjacent ones of the plurality of grooves.

17. The hydraulic piston of claim 13, further comprising:

a check valve that forms a passage that extends from the pocket, through the shoulder portion via an opening in a base surface at which the pocket terminates with respect to the third direction, and exits the shoulder portion via an opening in a rear surface of the shoulder portion that faces in the third direction and away from the neck portion.

18. The hydraulic piston of claim 13 wherein the neck portion is a first neck portion, the pocket is a first pocket, the inner surface is a first inner surface, and the outer surface is a first outer surface, the hydraulic piston further comprising:

a second neck portion that extends out from the shoulder portion along the third direction, the second neck portion having a third cross-sectional dimension measured in the first direction, wherein the third cross-sectional dimension is less than the first cross-sectional dimension;

a second pocket that extends into the second neck portion along the second direction, the second pocket entering the second neck portion through an opening in the rear surface, which is spaced from the shoulder portion by the second neck portion, at least a portion of the second pocket bounded by a second inner surface of the second neck portion, wherein the hydraulic surge dampener forms at least one passage that extends from the second pocket, through the second neck portion via an opening in the second inner surface, and exits the second neck portion via an opening in a second outer surface of the second neck portion that faces away from the second inner surface.

19. The hydraulic piston of claim 18 wherein the third cross-sectional dimension is equal to the second cross-sectional dimension.

20. The hydraulic piston of claim 19 wherein the hydraulic piston is symmetrical about a plane that is normal to the axis.

21. The hydraulic piston of claim 13 wherein the hydraulic surge dampener includes at least one through hole, and the opening in the inner surface has a closed shape perimeter.

22. The hydraulic piston of claim 21, further comprising:

a fastener receiving through hole that extends through the neck portion thereby forming a passage that extends from the pocket, through the neck portion via a second opening in the inner surface, and exits the neck portion via a second opening in the outer surface, wherein the fastener receiving through hole is positioned closer to the shoulder portion than the at least one through hole is from the shoulder portion.

23. The hydraulic piston of claim 22 wherein a cross-sectional dimension of the fastener receiving through hole is different than a cross-sectional dimension of the at least one through hole.

24. The hydraulic piston of claim 21 wherein the at least one through hole is linear such that a radial ray extending perpendicularly from the axis intersects both the opening in the inner surface and the opening in the outer surface of one of the at least one passages.

25. The hydraulic piston of claim 21 wherein the at least one through hole includes a plurality of through holes, and each of the plurality of through holes is equidistantly spaced from adjacent ones of the plurality of through holes.

* * * * *